Figure 1:
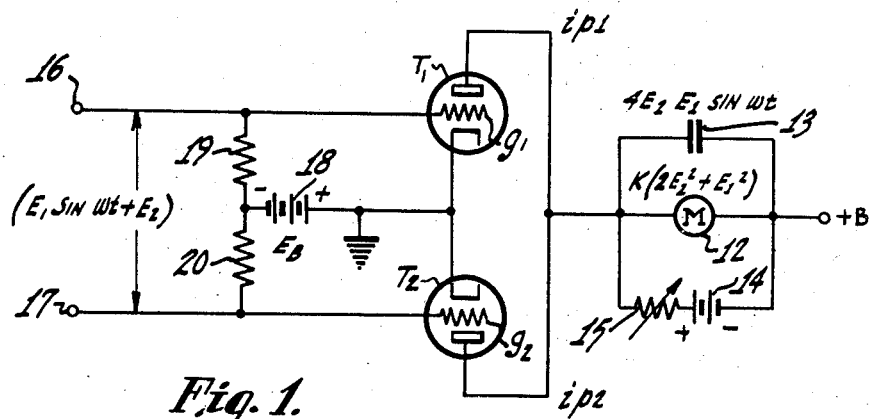

April 20, 1948. G. H. BROWN ET AL 2,440,004
ROOT MEAN SQUARE VOLTAGE MEASURING CIRCUIT
Filed April 4, 1946

INVENTORS
George H. Brown
& Wendell C. Morrison
BY C D Luska
ATTORNEY

Patented Apr. 20, 1948

2,440,004

UNITED STATES PATENT OFFICE 2,440,004

ROOT MEAN SQUARE VOLTAGE MEASURING CIRCUIT

George H. Brown and Wendell C. Morrison, Princeton, N. J., assignors to Radio Corporation of America, a corporation of Delaware Application April 4, 1946, Serial No. 659,480

8 Claims. (Cl. 171—95)

This invention relates to measuring devices such as are useful for measuring and indicating the root mean square value of an alternating voltage wave, and has for its principal object the provision of an improved device and method of operation whereby such value may be made available without the use of low impedance devices such as the thermocouple or the requirement that the wave be of sinusoidal form or have no unidirectional component.

The root mean square or effective value of an alternating voltage is equal to the square root of the average of the squares of the instantaneous values of the voltage. This root mean square value determines the heating effect of the alternating current produced by the alternating voltage. For this reason, the devices heretofore used or proposed for measuring the root mean square of an alternating voltage containing a unidirectional component have included a low impedance element such as a thermocouple, which while capable of measuring the root mean square value of a voltage containing both an alternating and a unidirectional component, are undesirable at times because of their low impedance.

The measuring device of the present invention has a high impedance (one-half a megohm, or more for low frequencies), and reads accurately regardless of the wave shape of the applied voltage or the presence of a unidirectional component. To this end, the voltage to be measured, is applied between the grids of a pair of triode elements (in separate tubes or in the same tube) which (1) are connected in push-pull relationship and (2) are operated on the square law portion of their characteristic so that the plate current of each triode is proportional to the square of the applied grid voltage. This condition of operation is brought about by proper choice of plate voltage and grid bias. The output currents of the two triode elements are connected in parallel so that their total output current is delivered to a network which includes (1) a meter for measuring the root mean square values, (2) a shunt path for excluding from the meter that alternating component of the total output current which is not a part of the root means square value, and (3) means for bucking out of the meter an undesired effect of the grid bias voltage.

Important objects of the invention are the provision of an improved root mean square measuring device, and the provision of a measuring device which functions accurately to measure the root mean square values of a voltage having alternating and unidirectional components.

The invention will be better understood from the following description considered in connection with the accompanying drawings and its scope is indicated by the appended claims.

Figure 2:
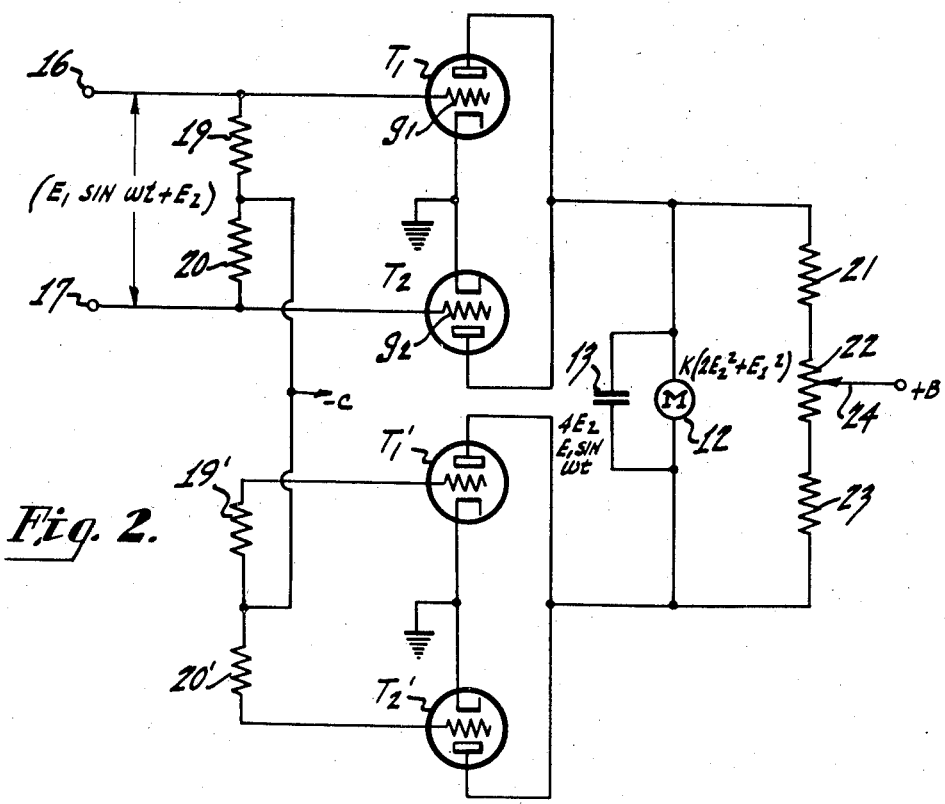

Referring to the drawings:

Fig. 1 is a wiring diagram of the improved root means square measuring device, and Fig. 2 is a wiring diagram of the preferred form of the device.

In the modification of Fig. 1, a pair of triodes $T_1$ and $T_2$ have potential applied to their anodes from a B+ terminal through a network which includes a meter 12, a capacitor 13 and a battery 14 which is in series with a resistor 15.

The voltage to be measured is applied between the terminals 16—17 which are connected to the control grids $g_1$ and $g_2$ of the triodes $T_1$ and $T_2$ respectively. Bias potential is applied to these grids from a battery 18 through the resistors 19 and 20.

This root-mean-square voltmeter is a square-law device. Its input contains a direct-current component as well as alternating terms. Thus cross-product terms not properly included in the determination of the root-mean-square value are brought into the reading unless the complex circuit with push-pull input and push-push output is used. An instance in which it is required to measure the root-mean-square value of a voltage including both alternating and unidirectional components is described on page 997 of the Proceedings of the I. R. E. and Waves and Electrons for December, 1946.

As indicated by Fig. 1, it may be assumed in considering the operation of the device that the voltage to be measured includes an alternating component $E_1 \sin \omega t$ and a direct current component $E_2$ so that Signal on $T_1 = E_1 \sin \omega t + E_2$ Signal on $T_2 = -(E_1 \sin \omega t + E_2)$ but and $i_{p1} = K(e_{g1})^2$ $i_{p2} = K(e_{g2})^2$ if the bias voltage on the tubes is $E_B$ then $$e_{g1} = E_B + E_1 \sin \omega t + E_2$$

$$i_{p1} = K(E_B + E_1 \sin \omega t + E_2)^2$$

$$i_{p1} = K(E_B^2 + E_2^2 + E_1^2 \sin^2 \omega t + 2E_BE_1 \sin \omega t + 2E_BE_2 + 2E_2E_1 \sin \omega t)$$

$$e_{g2} = E_B - (E_1 \sin \omega t + E_2)$$

$$i_{p2} = K(E_B - E_1 \sin \omega t - E_2)^2$$

$$i_{p2} = K(E_B^2 + E_2^2 + E_1^2 \sin^2 \omega t - 2E_BE_1 \sin \omega t - 2E_BE_2 + 2E_2E_1 \sin \omega t)$$

adding $$i_{p1} + i_{p2}$$

$$i_A = K(2E_B^2 + 2E_2^2 + 2E_1^2 \sin^2 \omega t + 4E_2E_1 \sin \omega t)$$

Since $2E_B^2$ is a fixed quantity, it can be bucked out or neutralized by the battery 14. The term $4E_2E_1 \sin \omega t$ can be by-passed by the capacitor 13. The term $2E_1^2 \sin^2 \omega t$ may be expressed as $$\frac{2E_1^2}{2} - \frac{2E_1^2}{2} \cos 2\omega t$$

or simply $E_1^2 - E_1^2 \cos 2\omega t$. The alternating current component of this term, that is $-E_1^2 \cos 2\omega t$ is bypassed by the capacitor 13. The direct-current component is $E_1^2$. Thus the reading of the meter M is proportional to $i_A = K(2E_2^2 + E_1^2)$. This is the sum of the squares of the required terms. If the input voltage applied to the grids $g_1$ and $g_2$ had contained other harmonics such as $E_3 \sin (2\omega t \pm \alpha)$ and $E_4 \sin (3\omega t \pm \beta)$, the final current would be $i_A = K(2E_2^2 + E_1^2 + E_3^2 + E_4^2)$. Thus in any case, all cross product terms involving the unidirectional bias voltage $E_B$ are eliminated leaving only the desired terms.

If the meter M be of the ordinary D'Arsonval type, its deflection will be proportional to the average current flowing through it so that its reading is proportional to the mean of the sum of the squares of the input voltage $(E_1 \sin \omega t + E_2)$. If the meter scale is made such that the reading is proportional to the square of the deflection, the root mean square value of the input voltage may be read directly from the meter.

Fig. 2 illustrates a modification of the invention wherein two additional triode elements $T_1'$ and $T_2'$ are provided for making the measuring device insensitive to variation in the cathode heater, grid bias and plate voltages. In this case, the cathode heater voltages are applied from the same source, the grid bias voltages are applied from the same source and the plate voltages are applied through the resistors 21, 22 and 23, the resistor 22 being provided with an adjustable terminal 24. It will be seen that variation in the cathode heater, grid bias or plate voltages of the triode elements $T_1$ and $T_2$ can not affect the potential between the leads of the meter M if the triode elements are identical. Practically, these elements are not likely to be absolutely identical, but they are so nearly identical as to provide a high order of stabilization so that the meter reading is substantially unaffected by variation in the operating voltages.

Since the input voltage $(E_1 \sin \omega t + E_2)$ is applied to the grids of the triodes $T_1$ and $T_2$ and is not applied to the grids of the triodes $T_1'$ and $T_2'$, there is caused to flow through the meter M a current $i_A = K(2E_2^2 + E_1^2)$ as previously indicated in connection with the modification of Fig. 1.

Thus the invention provides a root mean square meter which is insensitive to variation in its operating voltages, responds accurately to its input voltage, and functions to measure voltages having both unidirectional and alternating components.

We claim as our invention:

1. The combination of a pair of triode elements having their input circuits connected in push-pull and their output circuits connected in parallel through a common lead, means for applying to said input circuits a voltage having alternating and unidirectional components, and means for deriving from said common output lead a current which is proportional in value to the mean square value of said voltage.

2. The combination of a pair of triode elements having their input circuits connected in push-pull and their output circuits connected in parallel through a common lead, means for applying to said input circuits a voltage having alternating and unidirectional components, a meter connected in said common output lead, and means connected in shunt to said meter for bypassing output current components which involve a product of said alternating and unidirectional components.

3. The combination of a pair of triode elements having their input circuits connected in push-pull and their output circuits connected in parallel through a common lead, means for applying to said input circuits a voltage having alternating and unidirectional components, a meter connected in said common output lead, and means connected in shunt to said meter for bypassing output current components which involve a product of said alternating and unidirectional components, and means for neutralizing the effect on said meter of the grid bias potential of said triode elements.

4. The combination of two pairs of triode elements each pair of which has its input circuits connected in push-pull and its output circuits connected in parallel through a common lead, sources of grid bias and plate voltages common to said pairs of triodes, means for applying an input voltage to the input circuits of only one of said pairs, and means connected between the common output leads of said pairs for deriving the root mean square of said input voltage.

5. The combination of two pairs of triode elements each pair of which has its input circuits connected in push-pull and its output circuits connected in parallel through a common lead, sources of grid bias and plate voltages common to said pairs of triodes, means for applying an input voltage to the input circuits of only one of said pairs, a meter connected between the common output leads of said pairs, and adjustable resistance means connected in shunt to said meter for equalizing the anode voltages of said pairs.

6. The combination of two pairs of triode elements each pair of which has its input circuits connected in push-pull and its output circuits connected in parallel through a common lead, sources of grid bias and plate voltages common to said pairs of triodes, means for applying to the input leads of only one of said pairs of triodes an input voltage having alternating and unidirectional components, and means connected between the common output leads of said pairs of triodes for deriving the root mean square of said input voltage.

7. The combination of two pairs of triode elements each pair of which has its input circuits connected in push-pull and its output circuits connected in parallel through a common lead, sources of grid bias and plate voltages common to said pairs of triodes, means for applying to the input leads of only one of said pairs of triodes an input voltage having alternating and unidirectional components, a meter connected between the common output leads of said pairs of triodes, and means connected in shunt to said meter for bypassing an output current component involving the product of said alternating and unidirectional input voltage components.

8. The combination of a pair of triode elements having their input circuits connected in push-pull and their output circuits connected in parallel, means for applying to said input circuits a voltage having alternating and unidirectional components, and means for deriving from said output circuits a current which is proportional to the mean square value of said voltage.

GEORGE H. BROWN.
WENDELL C. MORRISON.

REFERENCES CITED

The following references are of record in the file of this patent:

UNITED STATES PATENTS

| Number | Name | Date |
|---|---|---|
| 1,919,215 | Gunn | July 25, 1933 |
| 2,014,102 | Conklin | Sept. 10, 1935 |